United States Patent
Mouiche et al.

(10) Patent No.: US 11,594,110 B2
(45) Date of Patent: Feb. 28, 2023

(54) METHOD AND SYSTEM FOR MONITORING THE PRESENCE OF A POINT-OF-SALE DISPLAY IN A SHOP, AT THE SIGHT OF CONSUMERS

(71) Applicant: INVOXIA, Issy les Moulineaux (FR)

(72) Inventors: Arnaud Mouiche, Savigny (FR); Amélie Caudron, Paris (FR); Eric Humbert, Boulogne Billancourt (FR)

(73) Assignee: INVOXIA, Issy les Moulineaux (FR)

( * ) Notice: Subject to any disclaimer, the term of this patent is extended or adjusted under 35 U.S.C. 154(b) by 0 days.

(21) Appl. No.: 17/124,135

(22) Filed: Dec. 16, 2020

(65) Prior Publication Data
US 2021/0192903 A1    Jun. 24, 2021

(30) Foreign Application Priority Data
Dec. 20, 2019  (EP) ..................................... 19306729

(51) Int. Cl.
| | | |
|---|---|---|
| *G07G 1/12* | (2006.01) | |
| *G07G 1/00* | (2006.01) | |
| *H04W 4/38* | (2018.01) | |
| *H04W 4/80* | (2018.01) | |

(52) U.S. Cl.
CPC ............. *G07G 1/12* (2013.01); *G07G 1/0009* (2013.01); *G07G 1/0036* (2013.01); *H04W 4/38* (2018.02); *H04W 4/80* (2018.02)

(58) Field of Classification Search
CPC ...... G07G 1/12; G07G 1/0009; G07G 1/0036; H04W 4/38; H04W 4/80
See application file for complete search history.

(56) References Cited

U.S. PATENT DOCUMENTS

| | | | | |
|---|---|---|---|---|
| 9,679,310 | B1* | 6/2017 | Saltzstein | .......... G06Q 30/0267 |
| 2002/0176388 | A1* | 11/2002 | Rankin | .................... H04W 4/02 |
| | | | | 370/328 |
| 2002/0183004 | A1* | 12/2002 | Fulton | ................... H04W 76/40 |
| | | | | 455/41.1 |
| 2003/0227384 | A1* | 12/2003 | Sweeney | ................ G08B 23/00 |
| | | | | 340/686.1 |
| 2006/0200378 | A1* | 9/2006 | Sorensen | ............... G06Q 30/02 |
| | | | | 705/7.29 |
| 2007/0254670 | A1* | 11/2007 | Kawaguchi | ........... H04W 28/20 |
| | | | | 455/445 |

(Continued)

FOREIGN PATENT DOCUMENTS

| | | |
|---|---|---|
| WO | 2016126631 A1 | 8/2016 |
| WO | 2016183302 A1 | 11/2016 |

OTHER PUBLICATIONS

Extended European Search Report related to Application No. 19306729.5 dated Apr. 17, 2020.

*Primary Examiner* — Chris Parry
*Assistant Examiner* — Hassan A Khan
(74) *Attorney, Agent, or Firm* — von Briesen & Roper, s.c.

(57) ABSTRACT

Method for monitoring the presence of a point-of-sale display in a shop, at the sight of consumers, the method comprising: acquiring signals from mobile devices by at least one signal sensor, sending one output from the signal sensor to an analyzing device, wherein the analyzing device: calculates an audience rate of the point-of-sale display on the basis of the output, and determines, on the basis of the audience rate, if the point-of-sale display is in the shop at the sight of consumers or not.

12 Claims, 3 Drawing Sheets

(56) References Cited

U.S. PATENT DOCUMENTS

| | | | |
|---|---|---|---|
| 2007/0276537 A1* | 11/2007 | Walker | G07F 17/3253 |
| | | | 700/238 |
| 2008/0176713 A1* | 7/2008 | Olivera Brizzio | A63B 24/00 |
| | | | 482/8 |
| 2008/0294476 A1* | 11/2008 | Dupre | G06Q 30/02 |
| | | | 705/7.29 |
| 2010/0191369 A1* | 7/2010 | Kim | G07F 5/18 |
| | | | 700/235 |
| 2010/0191631 A1* | 7/2010 | Weidmann | G06F 3/013 |
| | | | 348/E7.086 |
| 2010/0275267 A1* | 10/2010 | Walker | G06T 3/20 |
| | | | 709/206 |
| 2012/0315839 A1* | 12/2012 | Mumcuoglu | H04W 4/02 |
| | | | 455/2.01 |
| 2014/0282620 A1* | 9/2014 | Nuovo | G06Q 30/0241 |
| | | | 719/318 |
| 2015/0287045 A1* | 10/2015 | Brown | H04W 4/80 |
| | | | 705/14.4 |
| 2017/0068978 A1* | 3/2017 | Walden | H04W 4/02 |
| 2017/0228776 A1* | 8/2017 | Walden | G06Q 30/0255 |
| 2017/0287258 A1* | 10/2017 | Gerhard | G07F 9/105 |
| 2018/0012259 A1* | 1/2018 | Lazo | G06Q 30/0267 |
| 2019/0019210 A1* | 1/2019 | Yamazaki | G07F 9/002 |
| 2020/0202553 A1* | 6/2020 | Ikeda | G06T 7/20 |
| 2021/0235224 A1* | 7/2021 | MacDonald-Korth | |
| | | | G06Q 30/0261 |

* cited by examiner

METHOD AND SYSTEM FOR MONITORING THE PRESENCE OF A POINT-OF-SALE DISPLAY IN A SHOP, AT THE SIGHT OF CONSUMERS

CROSS REFERENCE TO RELATED APPLICATION

This application claims priority under the Paris. Convention to European Patent Application No. 19306729.5 filed on Dec. 20, 2019.

FIELD OF THE DISCLOSURE

This disclosure pertains to the field of methods and systems for monitoring the presence of a Point-of-sale display in a shop, at the sight of consumers, and point-of-sale displays comprising said systems.

BACKGROUND OF THE DISCLOSURE

Point-of-sale materials are provided to shops by the manufacturers of products. The point-of-sale materials can present products that are not owned by the owner of the shop, but the point-of-sale materials are contracted to be placed in a position which is visible by the consumers. A processor can be provided, as well as a point-of-sale display.

Manufacturers of the products displayed on the point-of-sale display generally arrange contractually with the owner of the shop to sell some of the products presented by the point-of-sale material.

When a manufacturer of a product has a plurality of such point-of-sale materials, in a plurality of shops, a large sales force has to be physically employed to verify the point-of-sale displays. For example, such verification includes checking if the point-of-sale display is in the shop, at the sight of the consumers.

Document US2003/0227384 describes a system for verifying the presence and absence of a point-of-sale display. The system includes a localization sensor, and a presence sensor. The measures taken by the presence sensor are analyzed to determine the proximity of people potentially viewing the display and the localization sensor is used to know the actual location of the display. The outputs of the sensor are compared to predetermined values to determine if an abnormal condition affecting the viewability of the display exists.

However, the measures used by the sensor are not sufficient to determine if a point-of-sale display is in the shop in an accurate way.

SUMMARY OF THE DISCLOSURE

This disclosure improves the situation.

It is proposed a method for monitoring the presence of a point-of-sale display in a shop, at the sight of consumers, the method comprising:
  acquiring signals from mobile devices by at least one signal sensor,
  sending at least one output from the signal sensor to an analyzing device, wherein the analyzing device:
    calculates an audience rate of the point-of-sale display on the basis of said output, and
    determines, on the basis of the audience rate, if the point-of-sale display is in the shop at the sight of consumers or not.

The calculation of an audience rate is particularly advantageous to determine in a certain manner if the point-of-sale display is at the sight of consumer or not. Indeed, if the point-of-sale display is positioned in the back shop, for example, only a few amounts of people will pass near it. Moreover, the audience rate can be calculated on the basis of several outputs: an output from the signal sensor, an output from the motion sensor or an output from the signal and motion sensors. It allows to increase the reliability of the method.

In another aspect, it is proposed a system for monitoring the presence of a point-of-sale display in a shop, at the sight of consumers, comprising:
  at least one signal sensor adapted to acquire signals from mobile devices,
  at least one analyzing device adapted to:
    receive at least one output from the signal sensor
    calculate an audience rate of the point-of-sale display on the basis of said output, and
    determine, on the basis of the audience rate, if the point-of-sale display is in the sight of consumers or not.

In another aspect, it is proposed a point-of-sale display comprising:
  at least one signal sensor adapted to acquire signals from mobile devices,
  at least one processor adapted to:
    receive at least one output from the signal sensor
    calculate an audience rate of the point-of-sale display on the basis of said output, and
    determine, on the basis of the audience rate, if the point-of-sale display is in the sight of consumers or not.

The following features, can be optionally implemented, separately or in combination one with the others:

The method further comprises:
detecting a movement by at least one motion sensor;
further sending at least one output from the motion sensor to the analyzing device to calculate the audience rate of the point-of-sale display on the basis of said outputs, and to determine, on the basis of said audience rate, if the point-of-sale display is in the shop at the sight of consumers or not.

The system further comprises
at least one motion sensor adapted to detect movement, wherein the analyzing device is adapted to further receive at least one output from the motion sensor to calculate the audience rate and to determine, on the basis of said audience rate, if the point-of-sale display is in the sight of consumers or not.

The point-of-sale display further comprises
at least one motion sensor adapted to detect movement, wherein the analyzing device is adapted to further receive at least one output from the motion sensor to calculate the audience rate and to determine, on the basis of said audience rate, if the point-of-sale display is in the sight of consumers or not.

The analyzing device calculates a new audience rate each time said analyzing device receives an output from the motion sensor indicating that the point-of-sale display has been moved.

It allows a saving of energy since the audience rate is not calculated continuously.

The analyzing device determines that the point-of-sale display is not in the shop at the sight of consumers if the calculated audience rate decreases successively to a detection, by the motion sensor, of a movement of the point-of-sale display.

This allows increasing the reliability of the method. Indeed, a movement of the point-of-sale display may imply a displacement of it, for example out of the sight of consumers. Then, if the audience rate is low and the point-of-sale display has been moved, it can be determined in a certain way that the point-of-sale display is not at the sight of consumers anymore.

The analyzing device calculates a retention rate to determine if the point-of-sale display attracts consumers, the retention rate being function of a received signal strength indication of the signals acquired by the signal sensor and of a duration of acquiring of the signals.

Then it allows to monitor the attractiveness of the point-of-sale display. It can also give more information about the visibility of the point-of-sale display. Indeed, if the point-of-sale display is in the shop and normally at the sight of consumers but the retention rate is very low, it can mean that the point-of-sale display is hidden in the shop.

The analyzing device is adapted to be in an active state in which said analyzing device calculates the audience rate, or in an inactive state in which said analyzing device does not calculate the audience rate.

The analyzing device moves from the inactive state to the active state periodically.

The analyzing device moves from the inactive state to the active state when the motion sensor detects a movement of the point-of-sale display.

It allows an economy of the resources, in particular energy resources and memory resources, since the audience rate is not calculated continuously.

The signal sensor is a Bluetooth sniffer.

The use of a Bluetooth sniffer allows the system to run an a small battery, optimizing the cost and size of the system.

An output of the analyzing device is communicated to a remote device (20) via an internet network, and preferably via a low power wide area network chosen between at least:
Sigfox®,
LoRa®, and/or
nb-lot.

The manufacturer of products presented on point-of-sale display is then aware of the monitoring of the point-of-sale display. In an embodiment, an alarm message is sent to the remote device when the process determines that the point-of-sale display is not in the shop, at the sight of consumers. The use of a low power wide area network also allows an economy of the energy resources.

The motion sensor, the signal sensor and the analyzing device belong to a detecting apparatus (11) able to be put in the shop to monitor the presence of the point-of-sale display, said analyzing device comprising a processor able to calculate the audience rate.

The system is then easy to install on the point-of-sale display, prior to the installation of said point-of-sale display in the shop.

The analyzing device further comprising a remote server, said remote server being able to communicate with the processor to receive the audience rate, the remote server being able to determine if the point-of-sale display is in the shop at the sight of consumer.

Then, the determination of the position of the point-of-sale display is made remotely. It allows more saving of energy since the processor only calculates the rates.

In an embodiment, a plurality of detecting apparatus communicates with the remote server. Then, for the manufacturer of the products presented on the point-of-sale display, all the information is gathered.

The system further comprises tracker (16), the remote server being able to further receive an output of said tracker (16).

In one embodiment, the tracker is a GPS device.

The tracker sends the position of the point-of-sale display. It allows to identify the point-of-sale display that is monitored. It is particularly advantageous if the manufacturer of products presented on point-of-sale display owes a plurality of point-of-sale displays, distributed in different shops or cities or even countries.

The remote server receives information about the shop and determines, based on the information about the shop and the calculated audience rate if the point-of-sale display is in the shop at the sight of consumers or not.

The information may be the opening hours of the shop. The information can also be the affluence hours of consumers in the shop. This increases even more the reliability of the method. Indeed, even if the audience rate is equal to zero, since the shop is closed, the remote server won't determine that the point-of-sale display is out of the sight of consumers.

The system further comprises a communication interface and a remote device, the communication interface being able to communicate an output of the analyzing device to the remote device via an internet network, and preferably via a low power wide area network chosen between at least:
Sigfox®,
LoRa®, and/or
nb-lot.

The remote device is the remote device of the manufacturer of products presented on point-of-sale display. The manufacturer of products presented on point-of-sale display is then aware of the monitoring of the point-of-sale display. In an embodiment, an alarm message is sent to the remote device when the process determines that the point-of-sale display is not in the shop, at the sight of consumers.

The system further comprises the point-of-sale display.

BRIEF DESCRIPTION OF DRAWINGS

Other features, details and advantages will be shown in the following detailed description and on the figures, on which.

DETAILED DESCRIPTION

Figures and the following detailed description contain, essentially, some exact elements. They can be used to enhance understanding the disclosure and, also, to define the invention if necessary.

Figure 1:
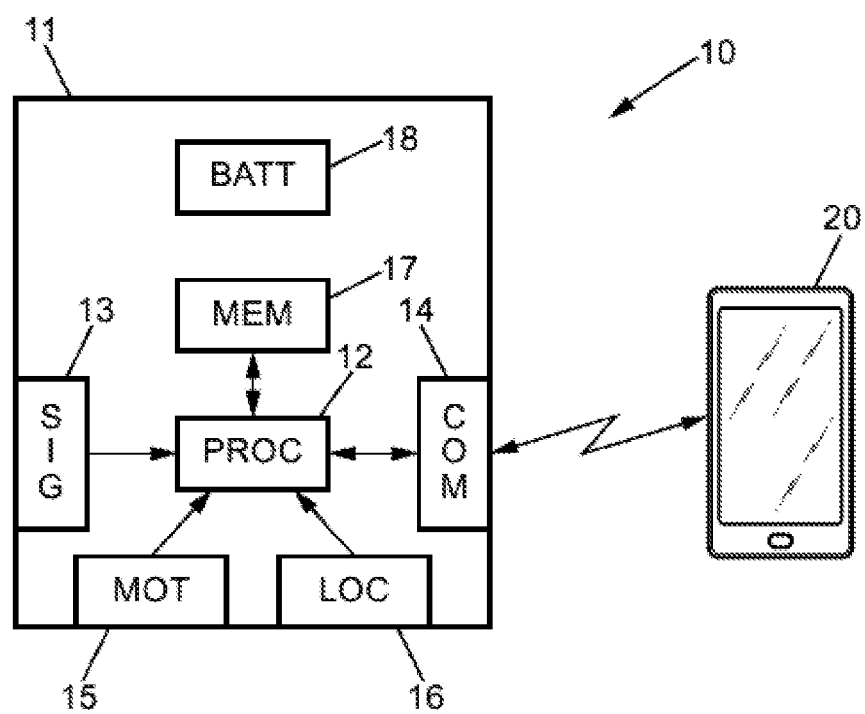
FIG. 1 is a block diagram of a system for monitoring the presence of a Point-of-sale display in a shop, at the sight of consumers according to an embodiment.

It is now referred to FIG. 1. FIG. 1 shows a block diagram of a system 10 for monitoring the presence of the point-of-sale display in a shop, at the sight of consumers according to a first embodiment.

For the manufacturer of the products, it is desirable to verify that the point-of-sale display is present and at the sight of consumers and not in the back shop, for example.

To this aim, a point-of-sale display can be provided with an embedded system for monitoring the presence of a point-of-sale display in a shop, at the sight of consumers 10, or "system 10". The system comprises an analyzing device 12, 19.

According to another embodiment, the system 10 is not embedded in the point-of-sale display but is provided as a detecting apparatus 11 that can be fixed on or positioned on/near the point-of-sale display.

A detecting apparatus 11 is provided. In this embodiment, the analyzing device 12, 19 is a processor 12. The detecting apparatus 11 includes the processor 12 for monitoring the presence of the point-of-sale display in the shop.

To this aim, the detecting apparatus 11 comprises a signal sensor 13. The signal sensor 13 is able to acquire signals from mobile devices (not shown). The mobile devices are for example the mobile devices of the consumers in the shop. Each time a consumer passes near the detecting apparatus 11, the signal sensor 13 acquires the signal from the mobile device of the consumer.

The signal sensor 13 may be able to receive advertising packets from Bluetooth. The signal sensor 13 is for example a Bluetooth sniffer.

The acquired signals are sent to the processor 12. The processor 12 is able to determine if the received signal has been acquired from an unknown mobile device. The processor 12 counts each signal that have been acquired from an unknown mobile device.

In one embodiment, the processor 12 integrates several signals acquired by the signal sensor 13 to calculate an audience rate being function of the number of unknown signals by time unit.

This audience rate is analyzed by the processor 12 to determine if the point-of-sale display is in the shop, at the sight of consumers, or if the point-of-sale display is not. For example, the point-of-sale display can be in the back shop.

In particular, the calculated audience rate is less important if the point-of-sale display is in the back shop than if it is in the shop at the sight of consumers.

The signal sensor 13 can also determine the interest of the consumers for the point-of-sale display.

For example, the processor 12 is able to calculate a retention rate of the received signals. To this aim, the audience rate calculated at a time t0 is associated with the unique identifier of each received signals, acquired from unknown mobile devices. The audience rate is recalculated at a time t1. The processor 12 is able to determine which identifiers associated with the audience rate calculated at the time t0 are still associated to the audience rate calculated at time t1. This allows to know if the consumers are actually interested by the point-of-sale display, or if they are just passing in front of it.

In an embodiment, the audience rates used in the calculation of the retention rate are calculated only for the signals received with the most important intensity.

For example, the retention rate is calculated every minutes, or preferably every thirty seconds.

The output of the processor 12 can be sent via a communication interface 14 to a remote device 20. The communication may be done via an internet network, and preferably via a low power wide area network chosen between at least Sigfox®, LoRa®, and/or nb-lot. The remote device 20 may be a device such as a computer, a smartphone or a dedicated box. For example, the remote device 20 is used by the manufacturer of the products presented on the point-of-sale display.

Preferably, the detecting apparatus 11 comprises a plurality of other sensors.

For example, the detecting apparatus 11 may also comprises a motion sensor 15. The motion sensor 15 is able to detect a movement of the point-of-sale display, for example if the point-of-sale display is moved.

For example, the motion sensor 15 is an accelerometer.

The motion sensor 15 may be used in conjunction with the signal sensor 13. In particular, the outputs of the motion sensor 15 are communicated to the processor 12.

The processor 12 calculates a new audience rate each time said processor 12 receives an output from the motion sensor 15, indicating that the point-of-sale display has been moved.

Then, the calculated audience rates can be associated with a single position.

If the processor 12 determines that the audience rate decreased since the previous calculation, and thus indicating that the point-of-sale display is out of the sight of consumers, but no displacement of the point-of-sale display has been detected by the motion sensor 15, the processor 12 will determine that the point-of-sale display is still in the shop.

In contrary, if the processor 12 determines that the audience rate decreased since the previous calculation, and thus indicating that the point-of-sale display may be in the back shop, and the motion sensor 15 detected a displacement of the point-of-sale display, the processor 12 is able to determine that the point-of-sale display is not at the sight of consumers anymore.

The detecting apparatus 11 may also comprise a tracker 16. The processor 12 may also receive an output of the tracker 16. This can be particularly advantageous if the manufacturer owns a plurality of point-of-sale displays, localized in a plurality of different shops. For example, the remote device 20 receives the output of the processor 12 comprising the presence or the absence of a point-of-sale display in a shop, at the sight of consumers, as well as the localization of this point-of-sale display, so the user of the remote device 20 knows which point-of-sale display corresponds to this output.

In an embodiment, the detecting apparatus 11 may also comprise a memory 17.

The memory 17 may be able to store the outputs of the signal sensor 13, the motion sensor 15, the tracker 16 and/or the output of the processor 12.

The detecting apparatus 11 may also comprise a battery 18.

In one embodiment, the detecting apparatus 11 is able to be in an active state or in an inactive state. In its inactive state, the processor 12 does not calculate the audience rate. In its active state, the process 12 calculates the audience rate.

According to one embodiment, in the inactive state the signal sensor 13 is not able to acquire signals. In this embodiment, the processor 12 moves from the inactive state to the active state periodically. Each time the processor 12 moves to the active state, the sensor signal 13 is able to acquire signals of mobile devices. The processor 12 is then able to count unknown mobile devices and calculate the audience rate.

According to another embodiment, the processor 12 moves from the inactive state to the active state when the motion sensor 15 detects a movement of the point-of-sale display. For example, if the motion sensor 15 is an accelerometer, the processor 12 moves from the inactive state to the active state when there is an overrun of the accelerometer threshold.

Advantageously, this allows a long autonomy of the detecting apparatus.

Furthermore, all the components of the detecting apparatus are miniaturized so the detecting apparatus itself is sufficiently small to be hidden from the owner of the shop.

This is allows by the use of the accelerometer as the motion sensor 15 and the Bluetooth sniffer as the signal sensor 13.

Moreover, the detecting apparatus is then cheap to manufacture and to dispose in a plurality of shops.

Figure 2:
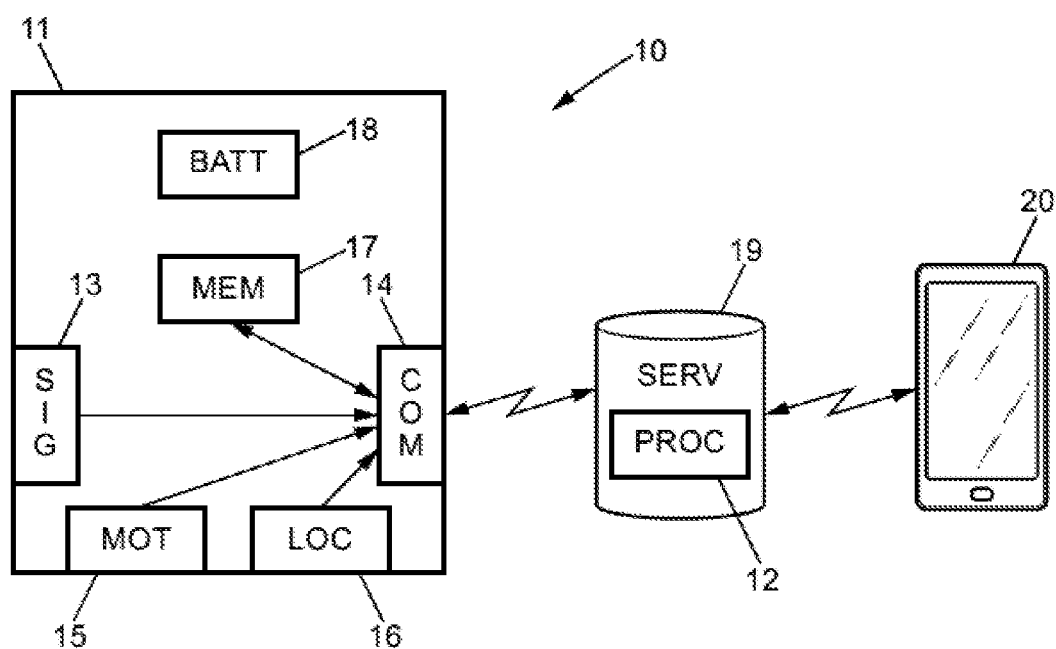
FIG. 2 is a block diagram of a system for monitoring the presence of a Point-of-sale display in a shop, at the sight of consumers according to another embodiment.

FIG. 2 shows a block diagram of the system 10 for monitoring the presence of the point-of-sale display in a shop, at the sight of consumers according to a second embodiment.

In the following specification, the same references are used to designate the same components.

In this embodiment, the analyzing device 12, 19 further comprises a remote server 19.

The remote server 19 communicates to the processor 12 to receive the outputs of the processor 12, the tracker 16 and/or the memory 17 via the communication interface 14. The communication may be done via the internet network, and preferably via a low power wide area network chosen between at least Sigfox®, LoRa®, and/or nb-lot.

The remote server 19 can also be in communication with the remote device 20 to communicate its outputs.

In this embodiment, the processor 12 is able to calculate the audience rate. The processor 12 transmits the calculated audience rate to the server 19. The server 19 then determines if the point-of-sale display is in the shop, at the sight of consumers or not.

The processor 12 may also be able to calculate the retention rate. The processor 12 transmits the calculated retention rate to the server 19. The server 19 then determines if the point-of-sale display attracts consumers or not.

Then, for example, the processor 12 transmits the calculated audience and/or retention rates to the server 19, after each new calculation of said rates.

In another embodiment, the processor 12 transmits the calculated audience and/or retention rates to the server 19 periodically.

Furthermore, in this embodiment, the server 19 may also store information about the shop in which the point-of-sale display is localized. For example, the information is the opening hours of the shop, the localization of the store and/or the affluence hours of consumers in the shop.

The server 19 is able to use this information to determine whether or not the point-of-sale display is in the shop, at the sight of consumers. In particular, if the processor 12 calculates a low audience rate, that could lead the server 19 to determine that the point-of-sale display is not in the shop, if this audience rate is calculated while the shop is closed, the server 19 won't determine that the point-of-sale display is not in the shop.

In the same manner, if the processor 12 calculates a low audience rate and the motion sensor 15 has detected that the point-of-sale display has been moved, if the shop is closed at this time the server 19 won't determine that the point-of-sale display is not in the shop.

The detection of the presence or absence of the point-of-sale display in the shop, at the sight of consumers, is then more accurate. Indeed, the use of the shop information in conjunction with the sensors 15, 16 avoids the communication of a wrong output of the server 19 to the remote device 20.

In another embodiment, not shown, the analyzing device 12, 19 only comprises the server 19. The server 19 directly receives the outputs of the signal sensor 13, the motion sensor 15 and/or the tracker 16 to calculate the audience rate and determine if the point-of-sale display is in the shop at the sight of consumers.

In the same way, the server 19 directly receives the outputs of the signal sensor 13, the motion sensor 15 and/or the tracker 16 to calculate the retention rate and determine if the point-of-sale display attracts consumers.

Figure 3:
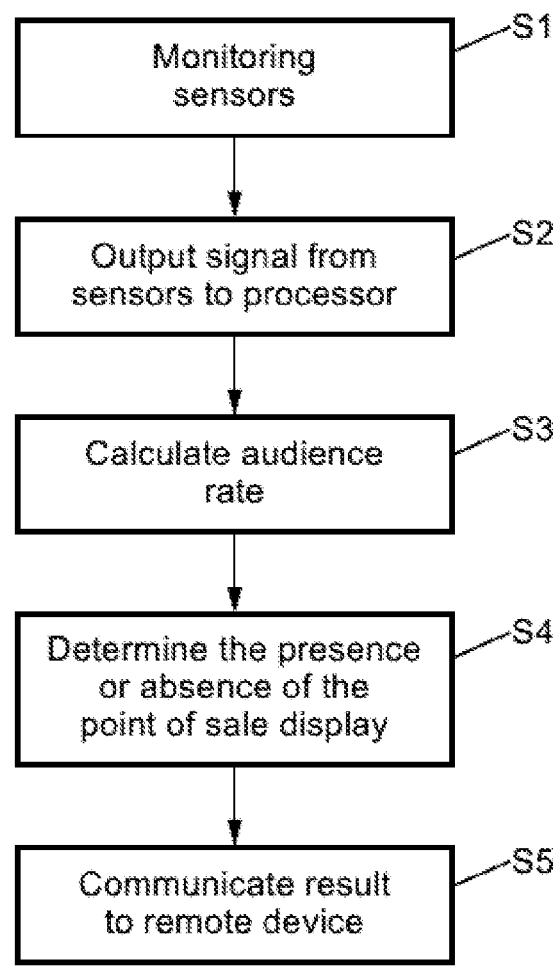
FIG. 3 is a flowchart illustrating the main steps of the method for monitoring the presence of a Point-of-sale display in a shop, at the sight of consumers according to an embodiment.

FIG. 3 shows the main steps of a method for monitoring the presence of the point-of-sale display in a shop, at the sight of consumers.

At step S1, the signal sensor 13 and/or the motion sensor 15 are monitored so to acquire signals from consumers' mobile devices and/or movement of the point-of-sale display or movement of the consumers near the point-of-sale display.

At step S2, the signals acquired by the sensors 13, 15 are outputted to the analyzing device 12, 19. The information stored in the memory 17 and the localization of the point-of-sale display acquired by the tracker 16 may also be outputted to the analyzing device 12, 19.

At step S3, the analyzing device 12, 19 calculates the audience rate to determine, at step S4, if the point-of-sale display is in the shop, at the sight of consumers, or not. The results are communicated to the remote device 20. For example, the processor 12 can send an alarm message to the remote device, informing the user of the remote device that the point-of-sale display is not in the shop, at the sight of consumers.

The invention claimed is:

1. The method for monitoring the presence of a point-of-sale display in a shop, at the sight of consumers, wherein said point-of-sale display has at least one motion sensor, the method comprising:
   acquiring signals from mobile devices by at least one signal sensor, said signals respectively including unique identifiers from said mobile devices;
   detecting a movement of the point-of-sale display by said at least one motion sensor;
   sending at least one output from the signal sensor to an analyzing device, said at least one output including said unique identifiers, and sending at least one output from the motion sensor to the analyzing device, wherein the analyzing device:
   counts said mobile devices on the basis of said at least one output and calculates an audience rate of the point-of-sale display, said audience rate being a function of the number of said mobile devices by time unit, and
   determines, on the basis of the audience rate and said at least one output from the motion sensor, whether the point-of-sale display is in the shop at the sight of consumers or not.

2. A method according to claim 1, wherein the analyzing device calculates a new audience rate each time said analyzing device receives an output from the motion sensor indicating that the point-of-sale display has been moved.

3. A method according to claim 1, wherein the analyzing device determines that the point-of-sale display is not in the shop at the sight of consumers if the calculated audience rate decreases further to a detection, by the motion sensor, of a movement of the point-of-sale display.

4. A method according to claim 1, wherein the analyzing device calculates a retention rate to determine if the point-of-sale display attracts consumers, the retention rate being function of a strength of the signals acquired by the signal sensor and of a duration during which signals from the same mobile devices are acquired.

5. A method according to claim 1, wherein the analyzing device is adapted to be either in an active state in which said analyzing device calculates the audience rate, or in an inactive state in which said analyzing device does not calculate the audience rate.

6. A method according to claim 1, wherein the signal sensor is a Bluetooth sniffer.

7. A system for monitoring the presence of a point-of-sale display in a shop, at the sight of consumers, comprising:
   at least one signal sensor adapted to acquire signals from mobile devices, said signals respectively including unique identifiers from said mobile devices;
   at least one motion sensor adapted to detect movement of said point-of-sale display; and
   at least one analyzing device adapted to:
      receive at least one output from the signal sensor said at least one output including said unique identifiers,
      receive at least one output from the motion sensor,
      count said mobile devices on the basis of said at least one output from said at least one signal sensor and said at least one output from the motion sensor, and calculate an audience rate of the point-of-sale display, said audience rate being a function of the number of said mobile devices by time unit, and
      determine, on the basis of the audience rate, whether the point-of-sale display is in the sight of consumers or not.

8. The system according to claim 7, wherein the motion sensor, the signal sensor and the analyzing device belong to a detecting apparatus able to be put in the shop to monitor the presence of the point-of-sale display, said analyzing device comprising a processor able to calculate the audience rate.

9. The system according to claim 8, wherein said analyzing device further comprising a remote server, said remote server being able to communicate with the processor to receive the audience rate, the remote server being able to determine whether the point-of-sale display is in the shop at the sight of consumer.

10. The system according to claim 9, further comprising a tracker, the remote server being able to further receive an output of said tracker.

11. The system according to claim 9, wherein the remote server is able to further receive information about the shop and determines, based on the information about the shop and the calculated audience rate, whether the point-of-sale display is in the shop at the sight of consumers or not.

12. A point-of-sale display comprising:
   at least one signal sensor adapted to acquire signals from mobile devices, said signals respectively including unique identifiers from said mobile devices;
   at least one motion sensor adapted to detect movement of said point-of-sale display;
   at least one analyzing device adapted to:
      receive at least one output from the signal sensor said at least one output including said unique identifiers,
      receive at least one output from the motion sensor,
      count said mobile devices on the basis of said at least one output from said at least one signal sensor and said at least one output from the motion sensor, and calculate an audience rate of the point-of-sale display, said audience rate being a function of the number of said mobile devices by time unit, and
      determine, on the basis of the audience rate, whether the point-of-sale display is in the sight of consumers or not.

* * * * *